US011348020B2

(12) United States Patent
Restrepo Conde et al.

(10) Patent No.: US 11,348,020 B2
(45) Date of Patent: May 31, 2022

(54) INTELLIGENT CROWD-SOURCED INSTABILITY DETECTION IN A COMPUTING ENVIRONMENT

(71) Applicant: INTERNATIONAL BUSINESS MACHINES CORPORATION, Armonk, NY (US)

(72) Inventors: Melissa Restrepo Conde, Raleigh, NC (US); Jonathan Dunne, Dungarvan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 792 days.

(21) Appl. No.: 16/264,576

(22) Filed: Jan. 31, 2019

(65) Prior Publication Data

US 2020/0250561 A1 Aug. 6, 2020

(51) Int. Cl.
*G06N 5/04* (2006.01)
*H04L 67/12* (2022.01)
*G06N 20/00* (2019.01)
*G06F 16/901* (2019.01)

(52) U.S. Cl.
CPC ......... *G06N 5/048* (2013.01); *G06F 16/9024* (2019.01); *G06N 20/00* (2019.01); *H04L 67/12* (2013.01)

(58) Field of Classification Search
CPC .......... G06N 5/04; G06N 20/00; H04L 29/08; H04L 67/12; G06F 16/901
USPC .......................................................... 706/12
See application file for complete search history.

(56) References Cited

U.S. PATENT DOCUMENTS

| 9,584,540 | B1 | 2/2017 | Chan et al. |
| 10,368,132 | B2* | 7/2019 | Barlaskar ......... H04N 21/25891 |
| 2012/0284090 | A1 | 5/2012 | Marins et al. |
| 2013/0275429 | A1* | 10/2013 | York ..................... G06F 16/435 |
| | | | 707/E17.002 |
| 2014/0279046 | A1* | 9/2014 | Sanada .............. G06Q 30/0269 |
| | | | 705/14.66 |
| 2015/0309988 | A1 | 10/2015 | Allen et al. |

* cited by examiner

*Primary Examiner* — Sibte H Bukhari
(74) *Attorney, Agent, or Firm* — Griffiths & Seaton PLLC

(57) ABSTRACT

Embodiments for crowd-sourced instability detection in an Internet of Things (IoT) computing environment by a processor. A plurality of recommendations from a plurality of crowd-sourced users associated with a social graph may be collected. Those of the plurality of recommendations having a bias score exceeding a central tendency value threshold may be identified and transformed according to one or more corrective actions.

15 Claims, 8 Drawing Sheets

INTELLIGENT CROWD-SOURCED INSTABILITY DETECTION IN A COMPUTING ENVIRONMENT

BACKGROUND OF THE INVENTION

Field of the Invention

The present invention relates in general to computing systems, and more particularly, to various embodiments for intelligent crowd-sourced instability detection in an Internet of Things (IoT) computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments of a cognitive system for implementing crowd-sourced instability detection in an Internet of Things (IoT) computing environment by a processor, are provided. In one embodiment, by way of example only, a method for intelligent crowd-sourced instability detection in a computing environment, again by a processor, is provided. A plurality of recommendations from a plurality of crowd-sourced users associated with a social graph may be collected. Those of the plurality of recommendations having a bias score exceeding a central tendency value threshold may be identified, highlighted and filtered according to a crowd-sourced deviation opinion (CSDO) model and/or one or more corrective actions. By highlighting and/or filtering the metadata and/or data having a bias score exceeding the central tendency value threshold from one or more crowd-source users, the integrity of the overall crowd-sourced data recommendations is maintained while also preventing the overall crowd-source data results from being obscured.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
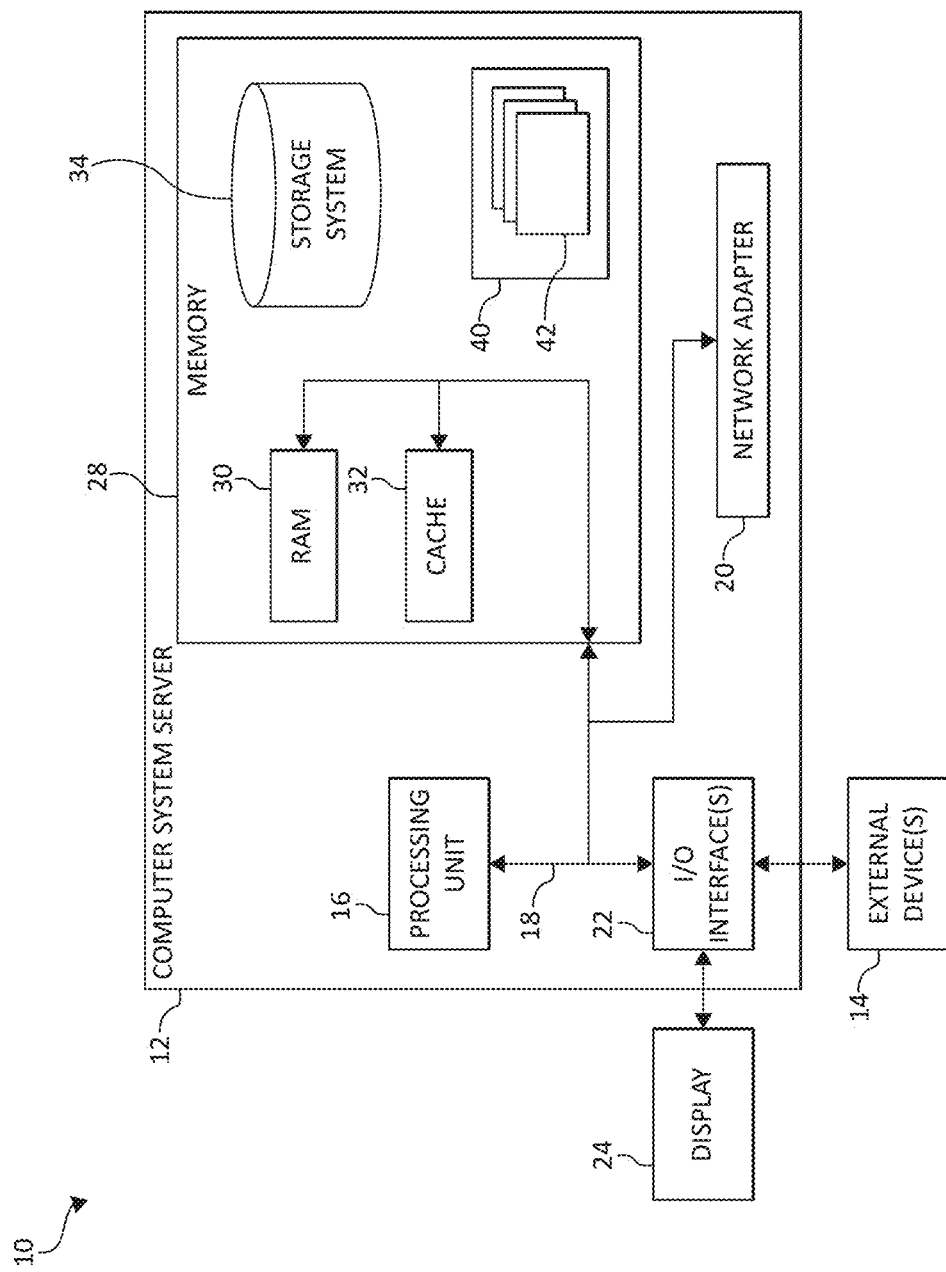
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Currently, a wide variety of computing devices (e.g., computers, laptops, wireless communication devices, IoT device, etc.) are used for communicating with one or more other parties/entities such as, for example, by sending emails, text messages, and even posting a communication message on a social media account. For example, a Question/Answer ("QA") system is an artificially intelligent computer system capable of answering questions posed in natural language. While QA systems excel at retrieving facts from online sources, such as documents, newspapers, journals, and the like, these systems are challenged by crowd-based information, such as opinions, that are often not found in traditional online fact sources.

Crowdsourcing obtains ideas from a large group of people such as that found in an online community. Crowd-sourced solutions are seen as a way to obtain a varied set of data within a broad form of data domains. Typically, for example, crowdsourcing may obtain multiple viewpoints and observations to provide a rich result. Intuition serves that the more varied the crowd-sourced input the more realistic the result. Accordingly, social data lends itself to crowd-sourced solutions by using the "wisdom of the crowd" to derive information that would not be possible from a single viewpoint. However, crowdsourcing does experience various challenges such as, for example, determining if bias data/recommendations compromise the integrity of the crowd-sourced data. Likewise, if there are persistent individuals who generate biased or irrelevant recommendations (e.g., low quality recommendations), an additional challenge of crowdsourcing is maintain the integrity of the crowd-sourced data, particularly when the biased data continuously appear in the crowdsourcing operations.

Thus, the present invention provides a cognitive system that implements intelligent crowd-sourced instability detection in a computing environment. A plurality of recommendations from a plurality of crowd-sourced users associated with a social graph may be collected. Those of the plurality of recommendations having a bias score exceeding a central tendency value threshold may be identified, highlighted, and/or filtered according to a crowd-sourced deviation opinion (CSDO) model.

In an additional aspect, a social graph is generated and defined of participants of crowdsourcing. Each of the recommendations of crowd-sourced users are tabulated. A CSDO model is derived and used to identify and normalize the data within the crowdsource responses. The CSDO can be used to provide a decay model to highlight metadata/data and filter the highlighted metadata/data from all crowd-sourced data. Specifically, metadata/data or crowdsourced data (e.g., a recommendation) having a bias score that exceeds a central tendency value threshold may be highlighted and/or filtered. Moreover, a set of central tendency values may be identified. The distance from the central value to each other value may be measured and may iteratively define a set of clustered values. Values that have a high deviance (distance) from central values are marked as outlier values, highlighted and or filtered. The users associated with high deviance values can be re-prioritized or filtered from the crowd-sourced framework. Users that are associated with static "central tendency" values may be ranked as high contributors (e.g., low deviance contributors).

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
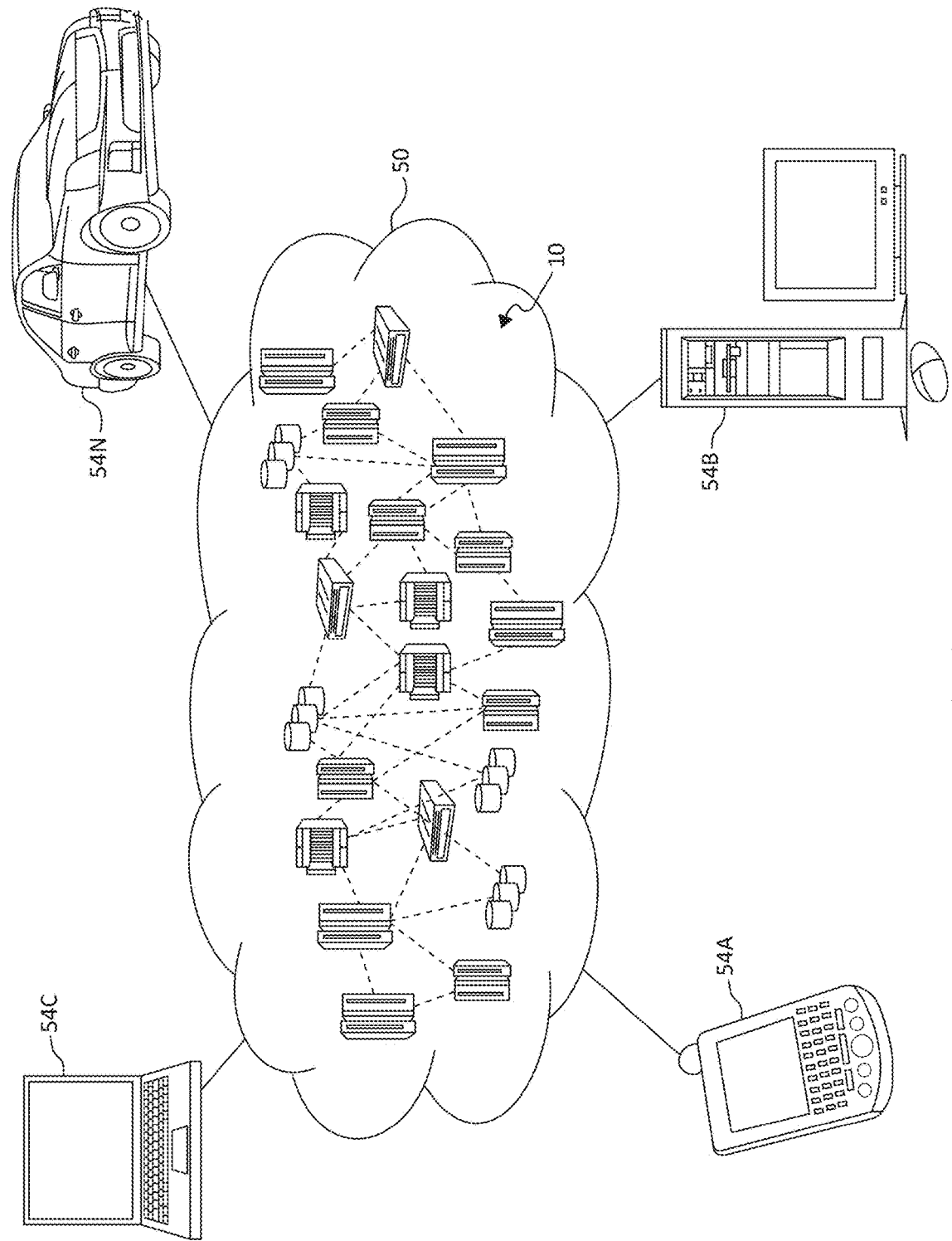
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
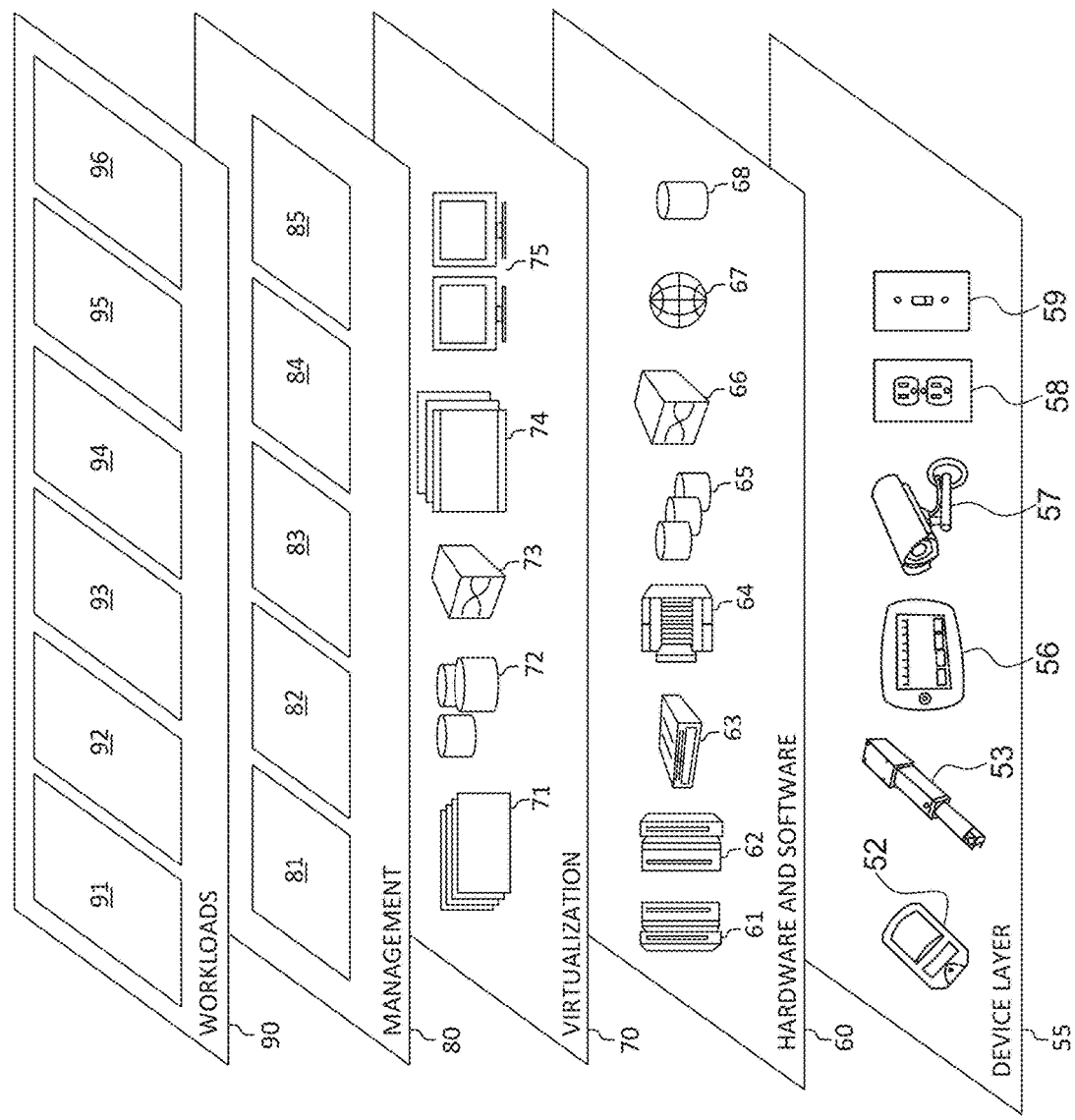
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent crowd-sourced instability detection. In addition, workloads and functions 96 for intelligent crowd-sourced instability detection may include such operations as data analysis, machine learning (e.g., artificial intelligence, natural language processing, etc.), user analysis, analysis of associates of a user, as will be further described. One of ordinary skill in the art will appreciate that the workloads and functions 96 for intelligent crowd-sourced instability detection may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution of intelligent crowd-sourced instability detection to automatic highlight and re-prioritize or filter biased recommenders within a social crowdsourcing construct by analyzing users, interactions with other users and metadata around the communications and interactions. A social graph of crowdsourced participants may be plotted, and recommendations of each crowd-sourced user may be tabulated. A crowd sourced deviation opinion (CSDO) model may be derived to identify and normalize the data within the crowd-source responses. The CSDO model may be used to provide a decay model to filter/transform metadata and/or data of at least a portion of one or more recommendations provided from one or more users from a crowd-sourced process.

Figure 4:
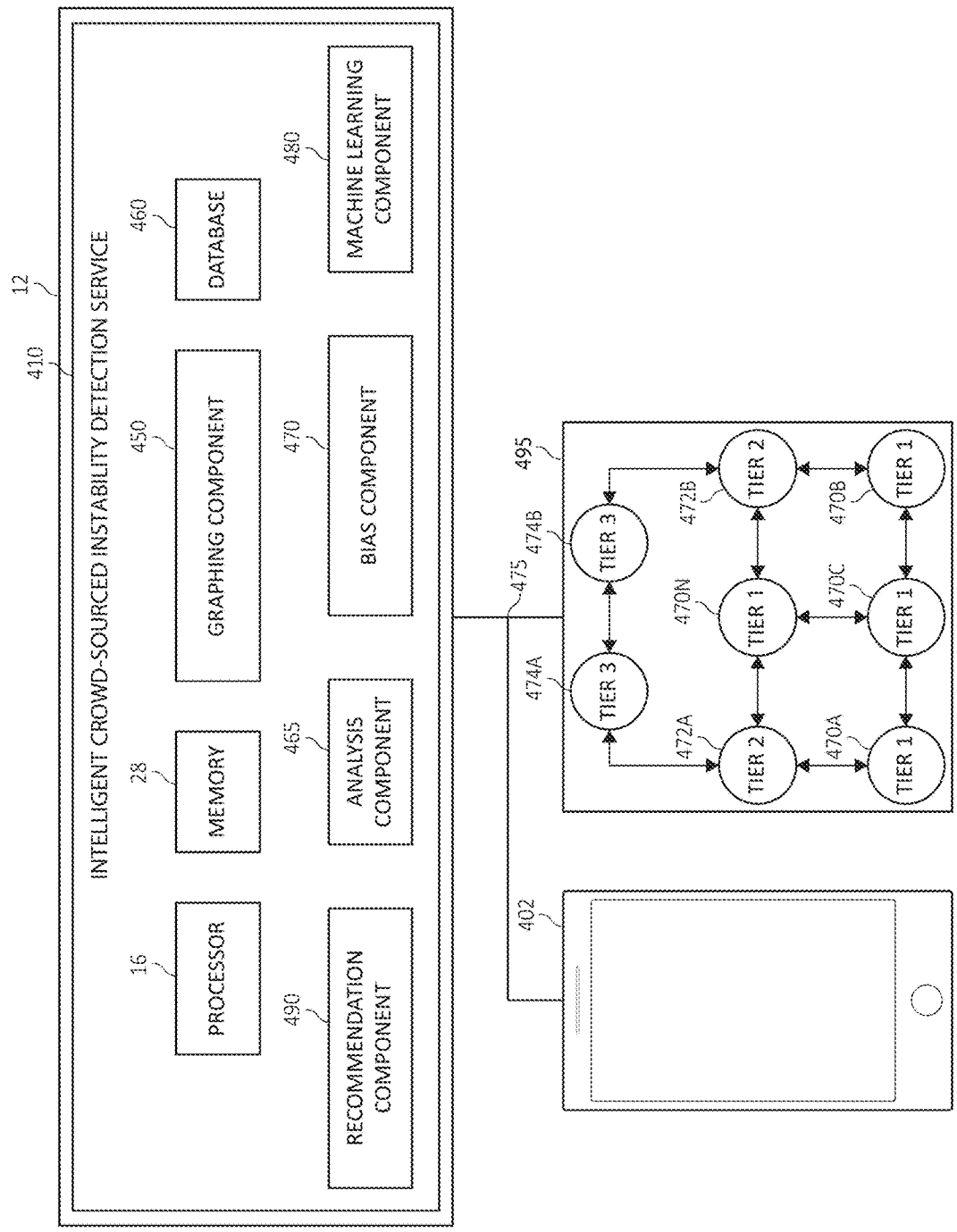
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4.

An intelligent crowd-sourced instability detection service 410 is shown, incorporating processing unit 16 ("processors") and memory 28 of FIG. 1 to perform various computational, data processing and other functionality in accordance with various aspects of the present invention. The intelligent crowd-sourced instability detection service 410 may be provided by the computer system/server 12 of FIG. 1. The intelligent crowd-sourced instability detection service 410 may be provided by the computer system/server 12 of FIG. 1. The intelligent crowd-sourced instability detection service 410 may include a graphing component 450, a database 460, a recommendation component 490, an analysis component 465, a bias component 455, and a machine learning model component 480.

As one of ordinary skill in the art will appreciate, the depiction of the various functional units in the intelligent crowd-sourced instability detection service 410 is for purposes of illustration, as the functional units may be located within the intelligent text font formatting service 410 or elsewhere within and/or between distributed computing components.

The intelligent crowd-sourced instability detection service 410 may be in communication with and/or association with one or more computing devices (e.g., user equipment "UE") such as, for example UE 402 (e.g., an internet of things "IoT" computing device such as, for example, a smartphone, smartwatch, desktop computer, laptop computer, tablet, and/or another electronic device that may have one or more processors and memory and configured for capturing images or video data). The UE 402 and the intelligent crowd-sourced instability detection service 410 may each be associated with and/or in communication with each other, by one or more communication methods/network (e.g., network 475), such as a computing network, wireless communication network, or other network means enabling communication.

In one aspect, the intelligent crowd-sourced instability detection service 410 may provide virtualized computing services (i.e., virtualized computing, virtualized storage, virtualized networking, etc.) to the one or more UE 402 (see also computing devices 54A-N of FIG. 2). More specifically, the intelligent crowd-sourced instability detection service 410 may provide, and/or be included in, a virtualized computing, virtualized storage, virtualized networking and other virtualized services that are executing on a hardware substrate.

The intelligent crowd-sourced instability detection service 410 may also function as a database, using database 460, and/or service that may store, maintain, and update data, services, and/or resources internal to and/or external to a cloud computing environment such as described in FIG. 2. In one aspect, intelligent crowd-sourced instability detection service 410 may assist in providing access to and/or assist in performing one or more various types of data, services and/or resources. The intelligent crowd-sourced instability detection service 410 may be used to harvest, collect, and store personal data in the database 460.

The graphing component 450 may create/generate the social graph of the plurality of crowd-sourced users such as, for example, social network graph 495. The social network graph 495 may be defined of participants of crowdsourcing such as, for example, crowd-sourced users 470A-N, 472A-B, and 474A-B. The crowd-sourced users 470A-N, 472A-B, and 474A-B may be analyzed such as, for example, analyzing their interactions with other users and collecting and analyzing the meta data around their types of communications and interactions.

In one aspect, the interactions, communications (e.g., social media posts and/or electronic communications), and/or recommendations may be identified for the crowd-sourced users 470A-N, 472A-B, and 474A-B at various social tiers (e.g., tier 1, tier 2, and/or tier 3 where each tier, for example, may be defined as a social distance and/or geological distance from a respective user). For example, recently posted comments from a crowd-sourced user 470B (e.g., a tier 1 social media friend) may identify a like or preference for Italian food along with comments, pictures, and/or ratings of a particular favorite Italian restaurant having a closer social or geographical distance, while a third-tier crowd-sourced user 474A may have posted comments, pictures, and ratings of a dislike for any Italian food at a greater or "further" social or geographical distance.

The analysis component 465 may identify a query or request from one or more of the crowd-sourced users 470A-N, 472A-B, and 474A-B such as, for example, "how is the Italian Food at restaurant A?" The analysis component 465 may collect a plurality of recommendations from the crowd-sourced users 470A-N, 472A-B, and 474A-B associated with a social graph.

The bias component 485 may assign the bias score to each recommendation (e.g., metadata or data) from each of the crowd-sourced users 470A-N, 472A-B, and 474A-B. As such, the recommendation component 490 may identify, highlight and/or filter metadata/data of those of the plurality of recommendations having a bias score exceeding a central tendency value threshold (e.g., a defined bias threshold which may be a defined value, percentage, and/or a range of values). That is, the metadata/data of each crowd source user may be analyzed. A bias score may be assigned to the metadata/data of the analyzed crowd-sourced data. In one aspect, the metadata/data having a bias score exceeding the central tendency value threshold may be highlighted. Alternatively, the metadata/data having a bias score exceeding the central tendency value threshold may be filtered for further analysis. For example, the highlighted and/or filtered data may be communicated back to the crowd-source user for revision.

Also, each recommendation submitted by each crowd-sourced user may also be tabulated by the recommendation component 490. For example, the recommendation component 490 may review the types of recommendations the crowd-sourced users 470A-N, 472A-B, and 474A-B make as part of an overall crowd-sourced workflow. For example, specific users may have their own internal "bias" toward a particular item, topic, subject, or query and this bias will be captured as part of the tabulation process.

In one aspect, the bias score may be an assigned value, a percentage, and/or a value within a range of values for indicating a degree of bias towards a particular query or communication based on a collection of weighted values of a plurality of factors, interactions, and/or communications (e.g., user defined factors). For example, each factor may be assigned a value, a value within a range of values, and/or a percentage. Each factor may then be accumulated and used to determine a total or overall bias score. The bias component 485 assigns a weighted value to each one of a plurality of factors, interactions, and/or communications to determine the bias score relating to the recommendation relating to query such as, for example, "how is the Italian Food at restaurant A?"

For example, crowd-sourced user 470B (e.g., a tier 1 social media friend or friend within a defined geographical distance) may be assigned a bias score indicating a positive or neutral position or preference given the previous comments relating to a like or preference for Italian food along with comments, pictures, and/or ratings of a particular favorite Italian restaurant. Alternative, third tier crowd-sourced user 474A may have posted comments, pictures, and ratings of a dislike for any Italian food. Each comment, picture, and/or rating (e.g., a plurality of factors, interactions, and/or communications) are assigned a weighted value and thus yield a negative position, negative position relating to Italian food. That is, third tier crowd-sourced user 474A is assigned a bias score that exceeds a central tendency value threshold.

The CSDO model may be determined/derived by the machine learning component 480. In one aspect, for the CSDO modeling, the machine learning component 480 may employ a number of operation such as, for example, a k-means clustering or a discriminant function model. In one aspect, the machine learning component 480, in association with the graphing component 450 may cluster each user (e.g., the crowd-sourced users 470A-N, 472A-B, and 474A-B) by a specific ordinal vote/preferential vote (e.g., rank outcomes in a hierarchy on an ordinal scale) preference based on location (e.g., a social distance such as, for example, the tier levels, and/or by actual geographical location). The machine learning component 480 may use the CSDO model to identify and highlight or filter biased data ("low quality data") from social crowd-sourced data. That is, the machine learning component 480 may learn and determine the central tendency value threshold according to according to the CSDO model. The central tendency value threshold may be set as a numerical value, a value within a range of values, and/or a percentage.

Thus, based on a bias score assigned to a recommendation from one or more of the crowd-sourced users 470A-N, 472A-B, and 474A-B (e.g., a user that issues a query for recommendations for a particular item, topic, subject, or other interest such as, for example, "how is the Italian Food at restaurant A?"), the machine learning component 480 may automatically highlight metadata/data from the recommendation and/or automatically filter the metadata/data from the recommendation from those of one or more of the crowd-sourced users 470A-N, 472A-B, and 474A-B having the bias score below the central tendency value threshold.

Moreover, the intelligent crowd-sourced instability detection service 410 may issue a communication (e.g., an alert, text, email, social media notification/post, etc.) to a user (e.g., the user issuing a query for responses) that contains each bias score of each of the crowd-sourced users 470A-N, 472A-B, and 474A-B. Accordingly, using an interactive graphical user interface ("GUI") of a user equipment (e.g., smart phone, computer, tablet, smart watch, or other IoT computing device), the user is enabled to also highlight and/or filter metadata/data from the recommendation from those of one or more of the crowd-sourced users 470A-N, 472A-B, and 474A-B having the bias score below the central tendency value threshold such as, for example, by highlighting, re-prioritizing or filtering the one or more of the crowd-sourced data 470A-N, 472A-B, and 474A-B (e.g., biased or "low quality" contributors) from social crowd-sourced computations. Thus, by highlighting and/or filtering the metadata and/or data having a bias score exceeding the central tendency value threshold from one or more crowd-source users, the integrity of the overall crowd-sourced data recommendations is maintained while also preventing the overall crowd-source data results from being obscured.

It should be noted that the CSDO model may use database 460 to store, maintain, and/or update a user profile for each of the crowd-sourced users 470A-N, 472A-B, and 474A-B. Thus, each bias score (e.g., historical bias scores) may be used to identify metadata/data of recommendations of those of the crowd-sourced users 470A-N, 472A-B, and 474A-B that have been historically identified as biased crowd sourced data. Each of the biased crowd-sourced data from one or more recommendations from the pool of crowdsourced users 470A-N, 472A-B, and 474A-B may be highlighted and/or filtered from crowdsourced computations.

Thus, the intelligent crowd-sourced instability detection service 410 may selectively highlight, filter, and/or request various revisions to metadata/data from one or more recommendations from one or more crowd-sourced users from future computations for optimal calculations. Thus, the collection of each bias score may indicate a set of "central tendency" values. The intelligent crowd-sourced instability detection service 410 may measure a distance from the "central" value to each other value, and iteratively define a set of clustered values. Values that have a high deviance (e.g., distance) from central values are marked as outlier values (e.g., bias values) and highlighted, re-prioritized or filtered. The users with associated with high deviance values (e.g., exceed a defined threshold) are highlighted, re-prioritized or filtered from the crowd-sourced framework. Users that are associated with static central tendency values are ranked as high contributors (e.g., bias score is neutral)

The CSDO model may be used to cluster each of the plurality of crowd-sourced users in the social network graph 495. Moreover, the machine learning component 480 may be initialized a to 1) train and learn a crowd-sourced deviation opinion (CSDO) model to cluster metadata/data of each recommendation from each of the plurality of crowd-sourced users in the social graph and identify and highlight, filter, and/or request revisions to one or more of those of the plurality of recommendations having a bias score exceeding a central tendency value threshold, 2) learn and assign the bias score to one or more recommendation data of a user profile for each of the plurality of crowd-sourced users, and/or 3) highlight, filter, and/or request revisions to one or more subsequent recommendations for each future request similar to metadata and/or data of the plurality of recommendations, received from those of the plurality of crowd-sourced users, having the bias score exceeding the central tendency value threshold.

Furthermore, the machine learning component 480 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMIDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Figure 5A:
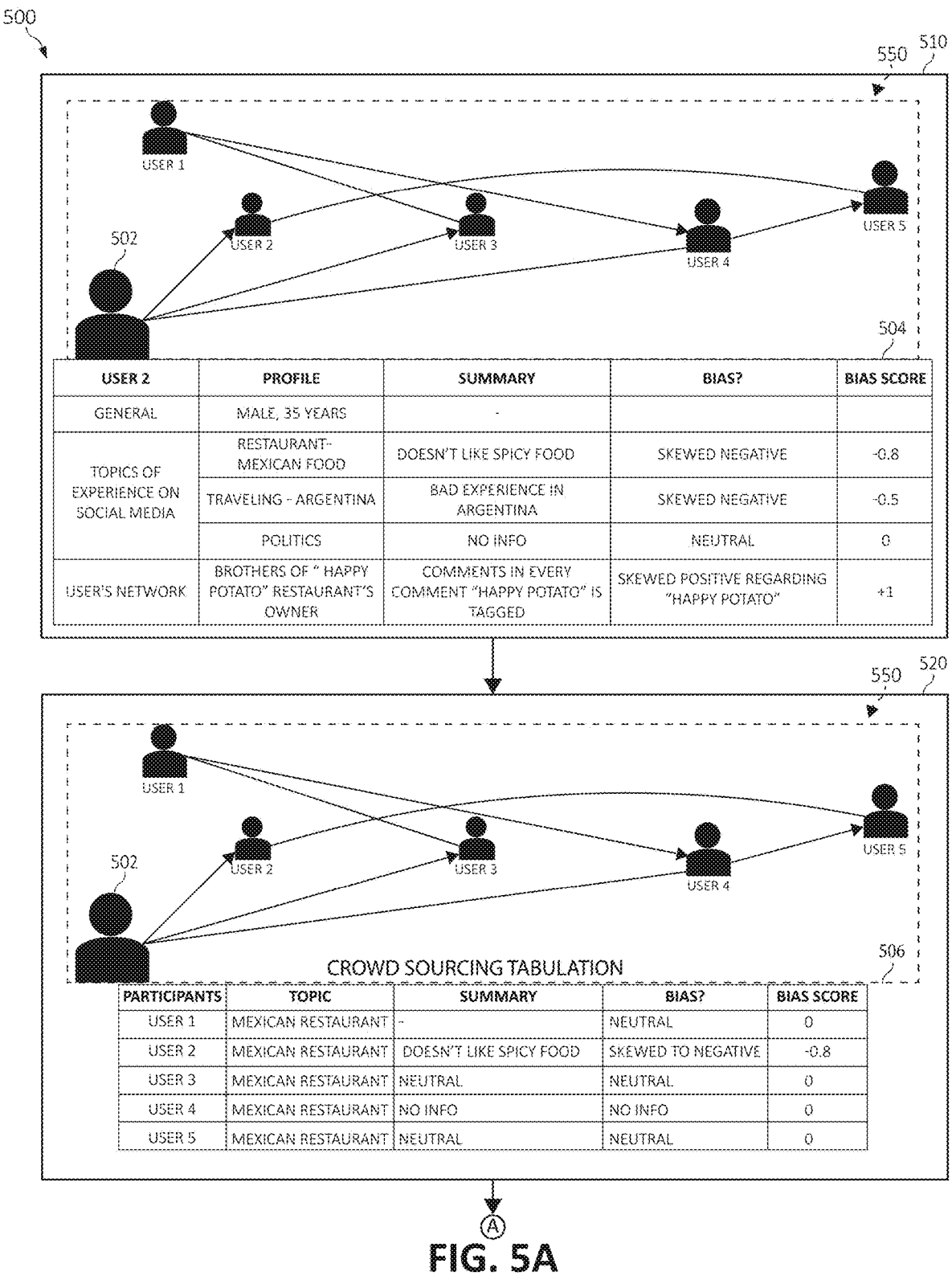
FIG. 5 is an additional block diagram depicting a cognitive system implementing intelligent crowd-sourced instability detection in a computing environment in which aspects of the present invention may be realized.
Figure 5B:
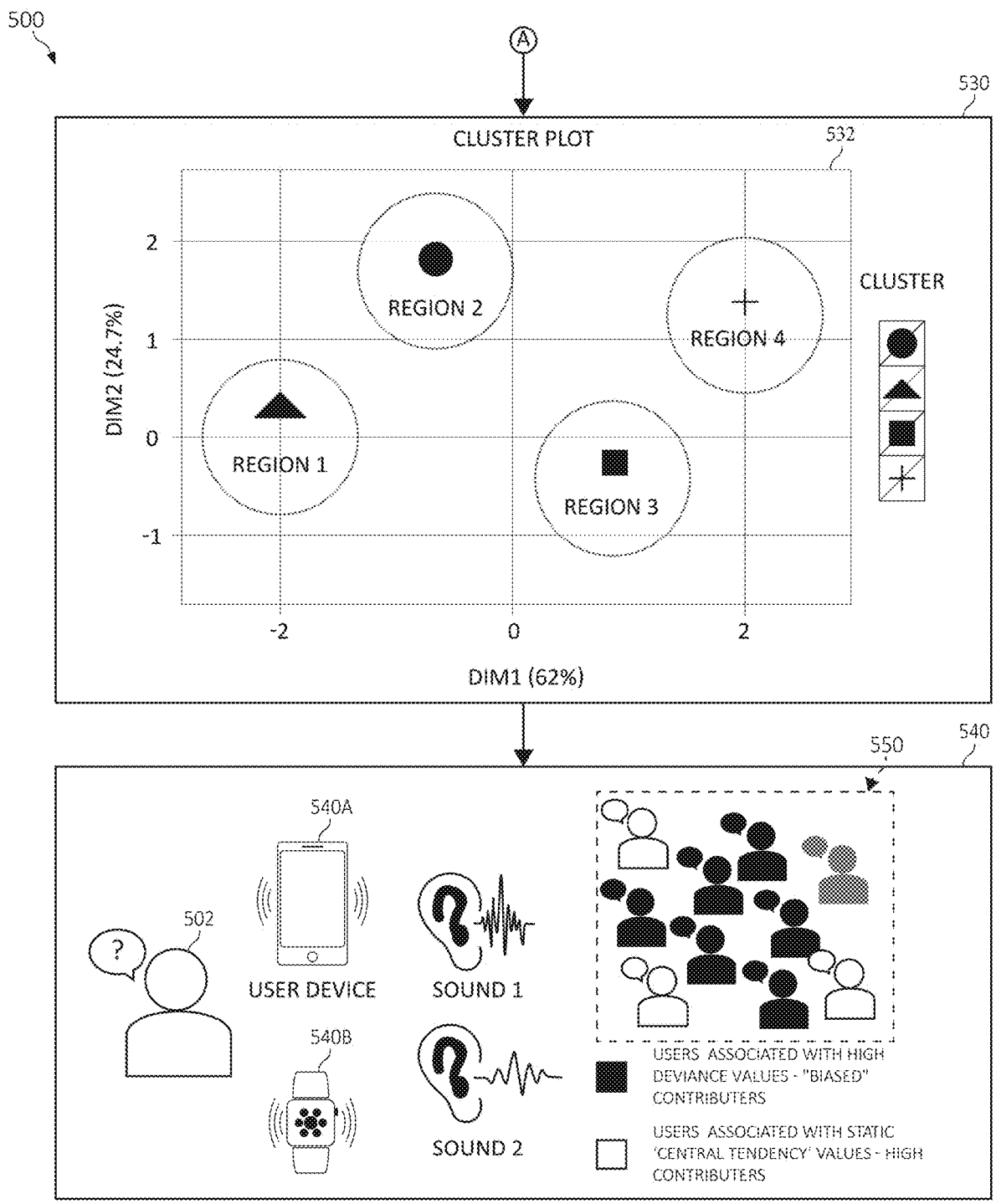

Turning now to FIGS. 5A-B, a block diagram of exemplary functionality 500 relating to implementing intelligent crowd-sourced instability detection in a computing environment is depicted, for use in the overall context of intelligent crowd-sourced instability detection according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4 (e.g., the intelligent crowd-sourced instability detection service 410 of FIG. 4). With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks.

In step 1, as in block 510, a social network graph 550 (e.g., social crowd-sourced graph) is defined of participants of crowdsourcing such as, for example, user 1-5, which may be in communication with a user 502. Each user (e.g., users 1-5) may be analyzed to identify one or more interactions with other users. Data and/or meta data associated with various types of communications and interactions may be collected, highlighted and analyzed and create a user profile. For example, user 502 may be in communication with user 2 (e.g., a family member "brother"). The user profile for user 2, for example, may indicate in each row of Table 504 general information, topics of experience/interest on social media and a user's network. Table 504 may indicate the name of the user, a profile, a summary, a bias (e.g., negative, positive, and/or neutral), and/or a bias score (e.g., negative value, positive value, or zero). For example, the user profile for user 504 may indicate general information that the user is a male, 35 years of age, having topics of experience/interest on social media relating to traveling to country A, and having a summary of a negative experience in country A. The bias towards country A is skewed as indicated with a bias score of negative 0.5 (e.g., −0.5). Alternatively, for example, no information is revealed pertaining to politics therefore there is a neutral bias towards the topic of politics and an assigned bias score of 0.

In step 2), as in block 520, each of the recommendations of all the crowd-sourced users (e.g., users 1-5) are tabulated. For step 2, each type of metadata and/or data of recommendations the users (e.g., users 1-5) make as part of an overall crowd-sourced workflow may be reviewed and analyzed. For example, specific users (e.g., user 2) will have their own internal "bias" and the bias will be captured as part of the tabulation process. For example, table 506 (table of crowd-sourcing tabulation) of block 520 indicates that types of communications for the topic of "Mexican restaurant" for user 2 indicates that user 2 dislikes spicy food and therefore has a negative bias (e.g., skewed bias) with an assigned negative bias score (e.g., −0.8).

In step 3), as in block 530 of FIG. 5B, a CSDO model is derived. For the CSDO model, one or more clustering operation may be performed (e.g., k-means clustering and/or a discriminant function model). As illustrated in the graph 532, users are clustered based on location such as, for example, region 1, region 2, region 3, and/or region 4.

In step 4), as in block 540 of FIG. 5B, the CSDO model may be used to identify and highlight and/or filter biased data and metadata from the social network graph 550 (e.g., a social crowd sourced/social media graph). For example, user 502, using one or more user equipment ("UE") such as, for example UE 540A (e.g., a smart phone or tablet) and/or UE 540B (e.g., a smart watch or other IoT computing device) may identify specific users within a cohort of crowd-sourced users such as, for example, users associated with a high deviance value (e.g., a value that is a defined numerical distance from a defined central tendency value) and/or users associated with static "central tendency" values (e.g., high concentrations).

Figure 6:
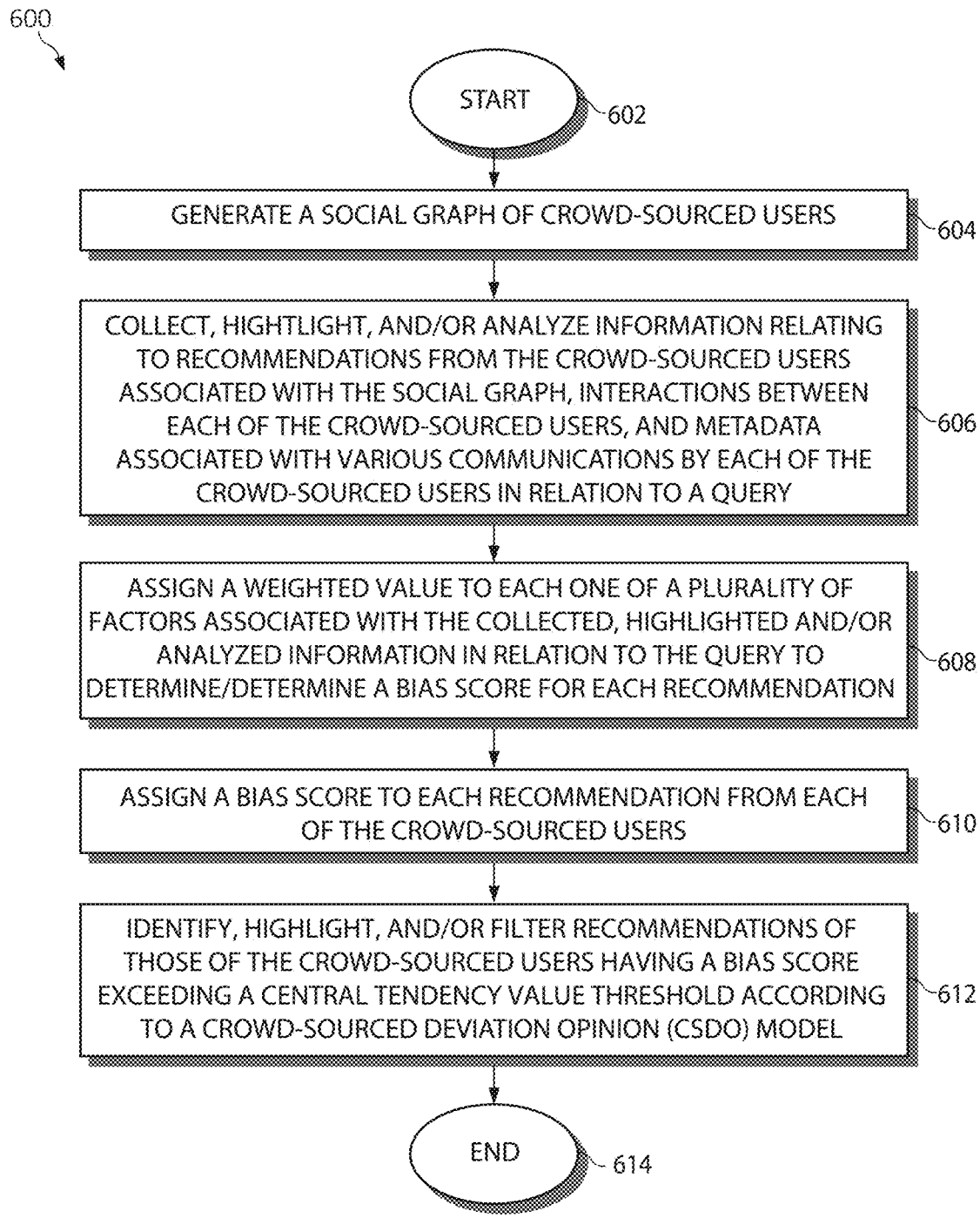
FIG. 6 is an additional flowchart diagram depicting an exemplary method for intelligent crowd-sourced instability detection in an Internet of Things (IoT) computing environment by a processor in which aspects of the present invention may be realized.

Turning now to FIG. 6, a method 600 for intelligent crowd-sourced instability detecting in an Internet of Things (IoT) computing environment is depicted, in which various aspects of the illustrated embodiments may be implemented. The various functions, components, and descriptions of FIGS. 1-4 may be included in FIG. 6. The functionality 600 may be implemented as a method executed as instructions on a machine, where the instructions are included on at least one computer readable medium or on a non-transitory machine-readable storage medium. The functionality 600 may start in block 602.

A social graph of crowd-sourced users may be generated, as in block 604. Information relating to recommendations from the crowd-sourced users associated with the social graph, interactions between each of the crowd-sourced users, and metadata associated with various communications (e.g., metadata and/or data) by each of the crowd-sourced users may be collected, highlighted, and/or analyzed in relation to a query, as in block 606. A weighted value may be assigned to each one of a plurality of factors associated with the collected, highlighted, and/or analyzed information in relation to the query to determine/define a bias score for each recommendation, as in block 608. A bias score may be assigned to each recommendation (e.g., the metadata and/or data of each recommendation) from each of the crowd-sourced users, 610. Those of the recommendations (e.g., the metadata and/or data of each recommendation) having a bias score exceeding a central tendency value threshold may be identified, highlighted, and/or filtered (or adjusted) according to a CSDO model, as in block 612. The functionality 600 may end in block 614.

Figure 7:
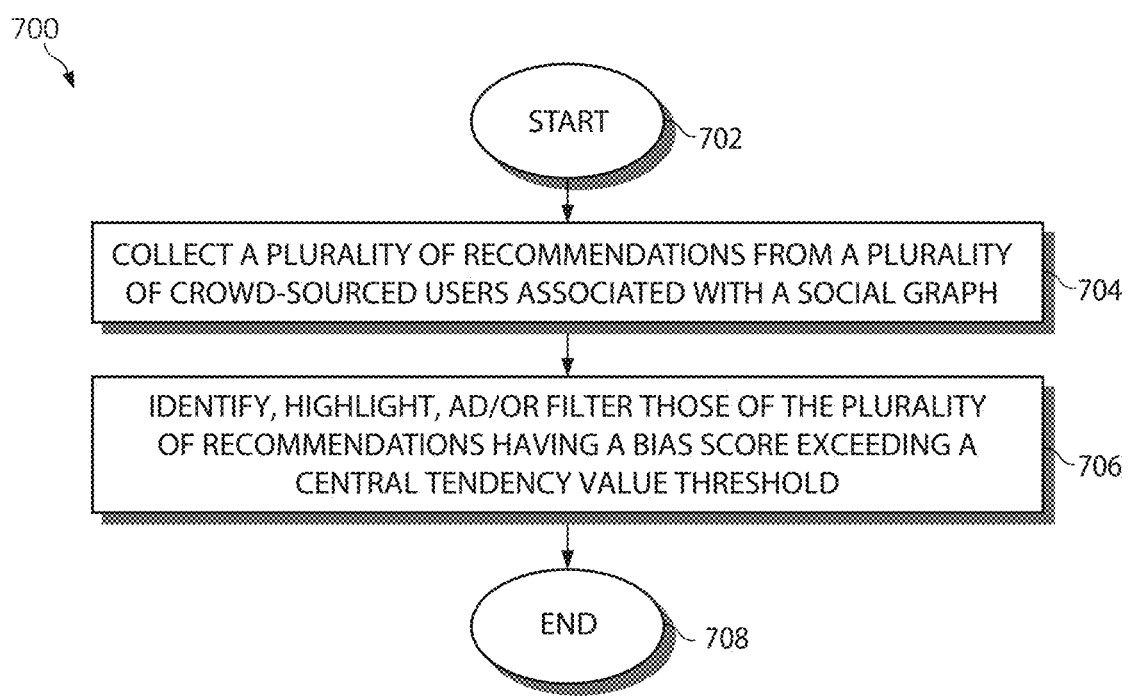
FIG. 7 is an additional flowchart diagram depicting an exemplary method for intelligent crowd-sourced instability detecting in an Internet of Things (IoT) computing environment by a processor, again in which aspects of the present invention may be realized.

Turning now to FIG. 7, a method 700 for intelligent crowd-sourced instability detection in an Internet of Things (IoT) computing environment is depicted, in which various aspects of the illustrated embodiments may be implemented. The various functions, components, and descriptions of FIGS. 1-4 may be included in FIG. 7. The functionality 700 may be implemented as a method executed as instructions on a machine, where the instructions are included on at least one computer readable medium or on a non-transitory machine-readable storage medium. The functionality 700 may start in block 702.

A plurality of recommendations from a plurality of crowd-sourced users associated with a social graph may be collected, as in block 704. Those of the plurality of recommendations having a bias score exceeding a central tendency value threshold may be identified, highlighted, and/or filtered (and/or revised) according to a crowd-sourced deviation opinion (CSDO) model, as in block 706. That is, metadata and/or data of those of the plurality of recommendations having a bias score exceeding the central tendency value threshold may be identified, filtered, highlighted, and/or transformed according to one or more corrective actions associated with the CSDO model. For example, the CSDO model may indicate, provide, and/or learn one or more corrective actions for transforming a recommendation having score exceeding (and/or less than) the central tendency value threshold. One or more corrective actions may indicate to filter, highlight, modify, adjust, or even reject all or portions of the recommendation. A corrective action may include proving a notification, alert, and/or warning to one or more users associated with the social graph. A corrective action may also include sending a notification to the owner/user that created/provided the recommendation to adjust or modify the recommendation in order for the recommendation to be shared, communicated, and/or published with one or more users. This notification may even request the owner/user that created/provided the recommendation to highlight and/or filter at least a portion of the comment. For example, a comment "I dislike topic A" may be highlighted, filtered, adjusted, and/or transformed. The various corrective actions may be user defined and/or automatically learned using one or more machine learning models, historical data, and/or user profiles. The functionality 700 may end in block 708.

In one aspect, in conjunction with and/or as part of at least one block of FIGS. 6-7, the operations of methods 600 and/or 700 may include each of the following. The operations of methods 600 and/or 700 may generate the social graph of the plurality of crowd-sourced users, assign the bias score to each recommendation from each of the plurality of crowd-sourced users, and/or assign a weighted value to each one of a plurality of factors to determine the bias score relating the recommendation.

The operations of methods 600 and/or 700 may learn and determine the central tendency value threshold according to according to a crowd-sourced deviation opinion (CSDO) model, cluster each of the plurality of crowd-sourced users in the social graph of according to the CSDO model. That is, the operations of methods 600 and/or 700 may initialize a machine learning component to the CSDO model to cluster each of the plurality of crowd-sourced users in the social graph and identify, filter, alter, adjust, reject, and/or transform those of the plurality of recommendations having a bias score exceeding a central tendency value threshold, learn and assign the bias score to a user profile for each of the plurality of crowd-sourced users, and/or reject subsequent recommendations for each future request similar to the plurality of recommendations from those of the plurality of crowd-sourced users having the bias score exceeding the central tendency value threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for crowd-sourced instability detection in a computing environment, comprising:

collecting a plurality of recommendations from a plurality of crowd-sourced users associated with a social graph;

identifying and filtering those of the plurality of recommendations having a bias score exceeding a central tendency value threshold according to one or more corrective actions;

assigning a weighted value to each one of a plurality of factors to determine the bias score relating to the plurality of recommendations;

executing machine learning logic to train and learn a crowd-sourced deviation opinion (CSDO) model to cluster each of the plurality of crowd-sourced users in the social graph, and identify, highlight, and filter at least a portion of metadata or data of those of the plurality of recommendations having the bias score exceeding the central tendency value threshold;

executing the machine learning logic to learn and assign the bias score to a user profile for each of the plurality of crowd-sourced users; and executing the machine learning logic to reject subsequent recommendations for each future request similar to the plurality of recommendations from those of the plurality of crowd-sourced users having the bias score exceeding the central tendency value threshold.

2. The method of claim 1, further including generating the social graph of the plurality of crowd-sourced users.

3. The method of claim 1, further including assigning the bias score to each recommendation from each of the plurality of crowd-sourced users.

4. The method of claim 1, further including learning and determining the central tendency value threshold according to the CSDO model.

5. The method of claim 1, further including clustering each of the plurality of crowd-sourced users in the social graph of according to the CSDO model.

6. A system for crowd-sourced instability detection in an Internet of Things (IoT) computing environment, comprising:

a processor; and a memory storing executable instructions that when executed cause the processor to:

collect a plurality of recommendations from a plurality of crowd-sourced users associated with a social graph;

identify and filter those of the plurality of recommendations having a bias score exceeding a central tendency value threshold according to one or more corrective actions;

assign a weighted value to each one of a plurality of factors to determine the bias score relating to the plurality of recommendations;

execute machine learning logic to train and learn a crowd-sourced deviation opinion (CSDO) model to cluster each of the plurality of crowd-sourced users in the social graph, and identify, highlight, and filter at least a portion of metadata or data of those of the plurality of recommendations having the bias score exceeding the central tendency value threshold;

execute the machine learning logic to learn and assign the bias score to a user profile for each of the plurality of crowd-sourced users; and execute the machine learning logic to reject subsequent recommendations for each future request similar to the plurality of recommendations from those of the plurality of crowd-sourced users having the bias score exceeding the central tendency value threshold.

7. The system of claim 6, wherein the executable instructions, when executed, further cause the processor to generate the social graph of the plurality of crowd-sourced users.

8. The system of claim 6, wherein the executable instructions, when executed, further cause the processor to assign the bias score to each recommendation from each of the plurality of crowd-sourced users.

9. The system of claim 6, wherein the executable instructions, when executed, further cause the processor to learn and determine the central tendency value threshold according to the CSDO model.

10. The system of claim 6, wherein the executable instructions, when executed, further cause the processor to cluster each of the plurality of crowd-sourced users in the social graph of according to the CSDO model.

11. A computer program product for crowd-sourced instability detection by a processor, the computer program product comprising a non-transitory computer-readable storage medium having computer-readable program code portions stored therein, the computer-readable program code portions comprising:

an executable portion that collects a plurality of recommendations from a plurality of crowd-sourced users associated with a social graph;

an executable portion that identifies and filter those of the plurality of recommendations having a bias score exceeding a central tendency value threshold according to one or more corrective actions;

an executable portion that assigns a weighted value to each one of a plurality of factors to determine the bias score relating to the plurality of recommendations;

an executable portion that executes machine learning logic to train and learn a crowd-sourced deviation opinion (CSDO) model to cluster each of the plurality of crowd-sourced users in the social graph, and identify, highlight, and filter at least a portion of metadata or data of those of the plurality of recommendations having the bias score exceeding the central tendency value threshold;

an executable portion that executes the machine learning logic to learn and assign the bias score to a user profile for each of the plurality of crowd-sourced users; and an executable portion that executes the machine learning logic to reject subsequent recommendations for each future request similar to the plurality of recommendations from those of the plurality of crowd-sourced users having the bias score exceeding the central tendency value threshold.

12. The computer program product of claim 11, further including an executable portion that generates the social graph of the plurality of crowd-sourced users.

13. The computer program product of claim 11, further including an executable portion that assigns the bias score to each recommendation from each of the plurality of crowd-sourced users.

14. The computer program product of claim 11, further including an executable portion that learns and determines the central tendency value threshold according to the CSDO model.

15. The computer program product of claim 11, further including an executable portion that clusters each of the plurality of crowd-sourced users in the social graph of according to the CSDO model.

* * * * *